May 12, 1970 — R. F. CATHCART III — 3,510,883
JOINT PROSTHESIS
Filed Oct. 30, 1967 — 2 Sheets-Sheet 1
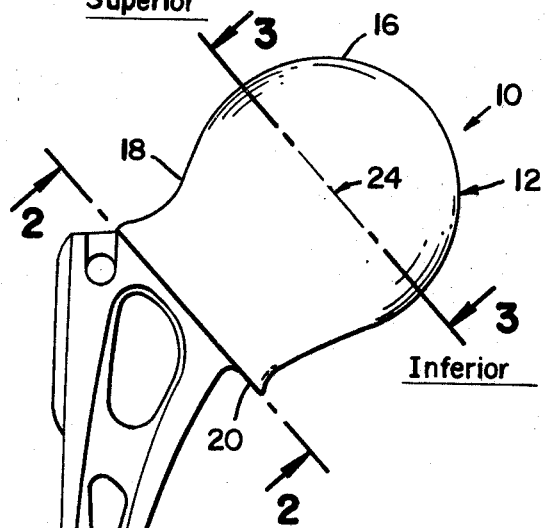
FIG_1
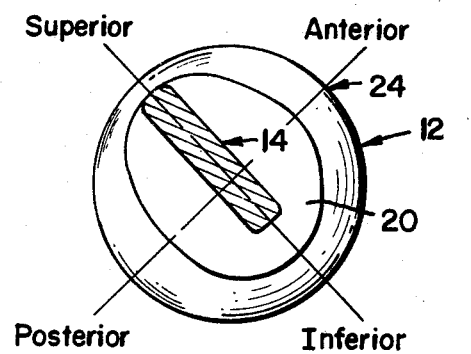
FIG_2
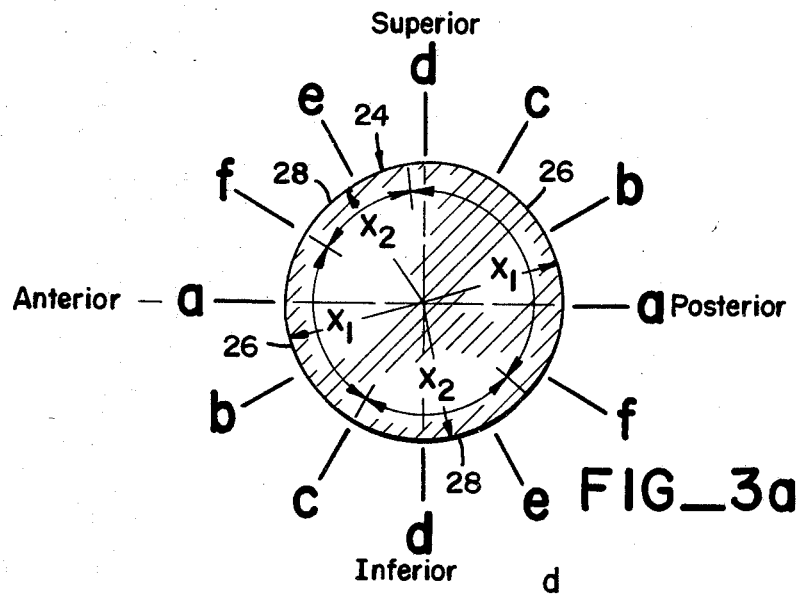
FIG_3a
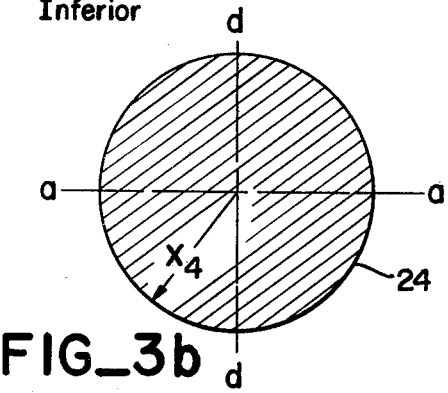
FIG_3b
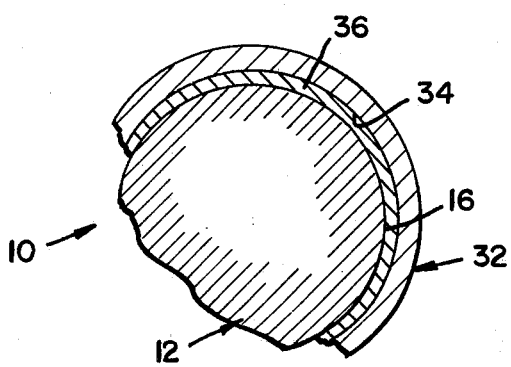
FIG_4
INVENTOR.
ROBERT F. CATHCART III
BY
Townsend and Townsend
ATTORNEYS May 12, 1970     R. F. CATHCART III     3,510,883
JOINT PROSTHESIS
Filed Oct. 30, 1967     2 Sheets-Sheet 2
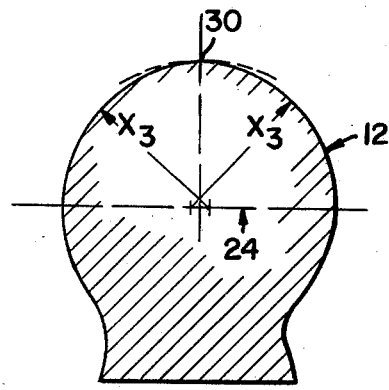
FIG_5a
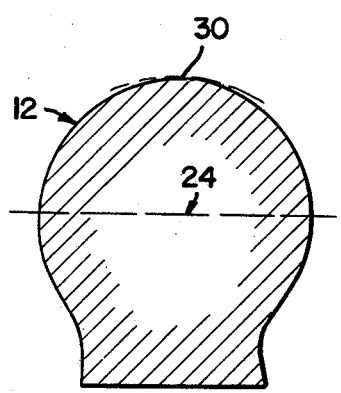
FIG_5b
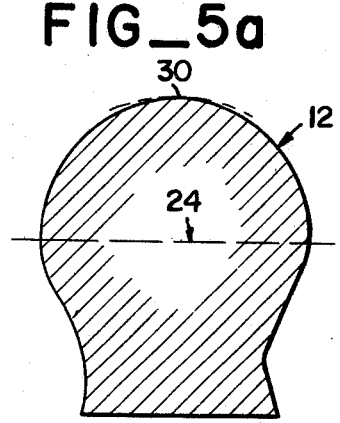
FIG_5c
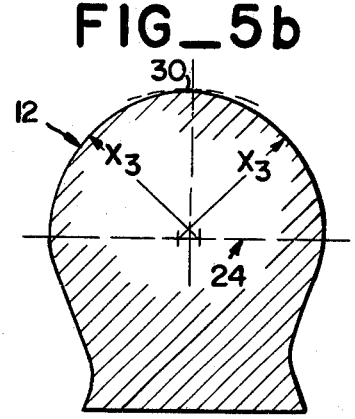
FIG_5d
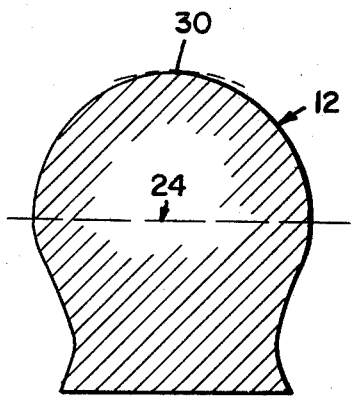
FIG_5e
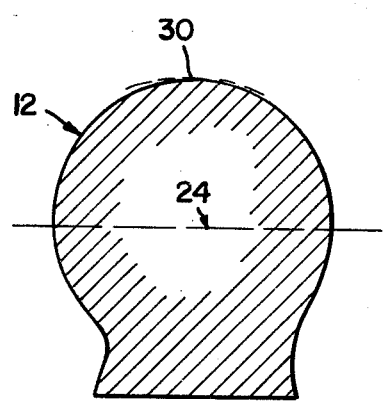
FIG_5f
*INVENTOR.*
ROBERT F. CATHCART III
BY
*Townsend and Townsend*
ATTORNEYS

United States Patent Office 3,510,883
Patented May 12, 1970

3,510,883
JOINT PROSTHESIS
Robert F. Cathcart III, 101 S. San Mateo Drive,
San Mateo, Calif. 94401
Filed Oct. 30, 1967, Ser. No. 678,972
Int. Cl. A61f *1/04*
U.S. Cl. 3—1                                   12 Claims

ABSTRACT OF THE DISCLOSURE

A hip prosthesis having a head member provided with a continuous periphery disposed between a neck portion and a rounded joint portion with the neck portion adapted to be rigidly secured to a mounting stem and the joint portion adapted to be shiftably mounted in the socket of a hip joint. The joint portion has a convex outer surface terminating at the continuous periphery of the head member and the convex outer surface has a curvature different from the curvature of the continuous periphery to provide a non-spherical configuration for the head member.

---

This invention relates to improvements in prosthesis and, more particularly, to a hip prosthesis having a non-spherical head member.

The present invention provides a hip prosthesis having a head member adapted to be coupled to the socket of a hip joint. The head member is comprised of a neck portion adapted to be secured to a mounting stem and a joint portion integral with the neck portion and adapted to be shiftably mounted in a hip socket. While the invention is herein directed to a replacement prosthesis for the hip, those skilled in the art will realize, after reading the following specification, that the teachings of the invention are applicable to the design of prostheses for use in any human body joint or in the practice of veterinary medicine.

Hip joint prostheses of conventional construction are provided with spherical head members which are shiftably received within the hip joint. These devices have been found to operate satisfactorily for a certain period of time, of the order of one to three years. However, beyond that time, a patient oftentimes experiences considerable pain as the prosthesis moves within the socket of the hip joint.

A major difficulty with the use of conventional prosthesis is that the articular cartilage of the acetabulum (lining of the socket of the hip joint) is often worn away exposing the underlining sensitive bone, thus causing pain. In addition, this wearing away of the cartilage and the resulting debris causes thickening, inflammation and pain in the synovial lining and capsule of the joint. The cartilage which covers the articulating ends of bone is tough, elastic and porous. It is a sponge-like living tissue which must derive its nutrition from either the synovial fluid of the joint or from the diffusion of nutrients from the underlying bone. To cause adequate circulation of nutrients through the cartilage, it must be subjected to intermittent pressures. Currently, one theory is now expounded that these intermittent pressures are provided by the weight of the body being put alternately on the hip joints by activities such as walking.

The teachings of the present invention are based upon the fact that the aforesaid intermittent pressures of weight bearing do not suffice under ordinary circumstances to cause the adequate circulation of nutrients through the cartilage. It is also based upon the fact that the articulating area of the prosthesis, i.e., the shape of the part that is in proximity of the cartilage, must be slightly irregular and not a sphere so that, with motion, the areas of cartilage in the acetabulum compressed by the prosthesis are alternated and not always the same. (The normal hip joint is always under some pressure because of the tensions of the muscles, the tendons, ligaments, and capsule about the joint.) A sphere, no matter how seated, will always exert pressure on the same areas of the acetabulum to thereby deprive the cartilage of normal nutrition and results in necrosis or death of the cartilage cells and the subsequent wearing away of the cartilage. The nerve endings associated with the joint thus become exposed and then are contacted by the spherical head of the prosthesis. The wearing away of the cartilage can be considered analogous to the constant pressure on the back of a bedridden patient causing bedsores on the patient's back.

A second theory currently being advanced is that weight is distributed more near the top of the head of the femur and that the weight is less and less away from that area. This theory is not believed to be correct and the present invention has been based also upon the fact that weight is more evenly distributed over all opposing cartilage by an elastic-hydraulic mechanism. Since the articulating cartilage between the bone of the femoral head and the acetabulum is elastic and porous and permeated with synovial fluid, the cartilage behaves much as a fluid and is relatively incompressible under weight-bearing conditions. The compression of the cartilage is only proportional to the amount of synovial fluid that can escape from the cartilage during the brief moment of weight-bearing, such as during walking. Synovial fluid is viscous and the pores of cartilage are very small so that the amount of synovial fluid which can escape is small. Thus, compression due to weight-bearing is small.

On the other hand, irregularities of shape of the head of the prosthesis, as in this invention, with motion causes compression in alternating areas of the cartilage. Thus, nutrients are drawn or pumped in, out of and through the cartilage more rapidly. The cartilage thus requires some irregularity in the shape of the prosthesis head to be properly provided with the necessary nutrients. The degree of irregularity should be somewhere between a sphere (but not including a sphere) and the amount of irregularity to which normal elastic cartilage can be expected to accommodate. If the articular surface is too irregular, pressures at the points of contact would be too high and would wear the cartilage out too rapidly. The irregular shape of the prosthesis head of this invention will, due to the above described mechanism, allow for the proper nutrition of the acetabulum cartilage and allow the cartilage to adapt itself to the new shape of the head. The prosthesis of this invention is, therefore, distinct from conventional hip prostheses in that the latter are intentionally and desirably made spherical.

The primary object of this invention is therefore to provide a joint prosthesis whose head member has a non-spherical configuration to provide means for subjecting the cartilage in the socket of a body joint to intermittent pressures and thereby cause adequate circulation of nutrients through the cartilage to be maintained as the prosthesis serves as a replacement at the body joint.

Another object of this invention is to provide a joint prosthesis of the type described wherein the head member has a continuous central periphery of a first radius of curvature and a rounded joint portion whose convex outer surface is of a second radius of curvature so that the head member itself will depart from a spherical configuration as is found in conventional prostheses and thereby be able to provide compressive forces at alternating locations of the cartilage to thereby assure a rapid pumping of nutrients therethrough.

Other objects of this invention will become apparent as the following specification progresses, reference being had to the accompanying drawings for a preferred embodiment of the invention.

In the drawings:

FIG. 1 is a side elevational view of one form of the prosthesis of this invention;

FIG. 2 is a cross-sectional view taken along line 2—2 of FIG. 1;

FIG. 3 is a cross-sectional view taken along line 3—3 of FIG. 1;

FIG. 3b is a view similar to FIG. 3a but showing the cross-section of another form of the invention;

FIG. 4 is a schematic view of a hip socket with the head member of the prosthesis of this invention shiftably mounted therein; and FIGS. 5a, 5b, 5c, 5d, 5e and 5f are cross-sectional views through the head member of the prosthesis taken along lines a—a, b—b, c—c, d—d, e—e and f—f of FIG. 3.

The hip prosthesis of this invention is broadly denoted by the numeral 10 and includes a head member 12 secured to a mounting stem 14 in the manner shown in FIG. 1. Head member 12 includes a rounded joint portion 16 and a neck portion 18 integral with joint portion 16. Portion 16 is adapted to be shiftably mounted in the socket of a hip joint in the manner shown in FIG. 4 and portion 18 is rigidly secured to one end of stem 14. The opposite end of the stem tapers to a point so that the stem is adapted to be driven into bone structure adjacent to the joint. In this way, the prosthesis is held in a position with joint portion 16 maintained in the hip socket.

Head member 12 has a substantially smooth outer surface and it tapers in the region of neck portion 18, the latter having an outer surface 20 at the junction of the head member and the stem. Surface 20 is shaped to seat properly against the adjacent anchoring bone structure which generally is severed so that it also has a slightly convex end surface. The adjacent surfaces in contact with each other thus assure no relative movement between the prosthesis and the anchoring bone structure.

FIG. 1 illustrates the prosthesis for the right hip in that the anterior extremity of head member 12 is viewable as the central portion of the latter between the superior and inferior extremities. The posterior extremity will, of course, be opposite to the anterior extremity and is not shown in FIG. 1. The left hip prosthesis will generally be a mirror image of the right hip prosthesis for most patients so that a description of the right unit will suffice as a description for both units.

Prosthesis 10 is provided with a centrally disposed, continuous outer periphery denoted by the numeral 24, periphery 24 being substantially at the junction of portions 16 and 18. Each of portions 16 and 18 has a continuous extremity which merges smoothly and terminates at periphery 24 as shown in FIGS. 5a–5f.

In a first form of the invention, periphery 24 is defined by a first pair of opposed stretches 26 which have a radius of curvature denoted by $x_1$ and a second pair of opposed stretches 28 having a radius of curvature denoted by $x_2$, radius $x_2$ being different from radius $x_1$. Each stretch 28 is disposed between and connects with respective ends of stretches 26. The respective lengths of the stretches and their locations relative to the superior, inferior, anterior and posterior extremities are shown by the arcuate lines in FIG. 3a.

The outer surface of joint portion 16 is different in curvature from periphery 24 to provide a non-spherical configuration for head member 12. To set forth this difference, reference is had to two mutually perpendicular sagital planes passing through joint portion 16 and extending substantially along lines 2—2 and d—d of FIG. 3. For the a—a and d—d planes (FIGS. 5a and 5d), the radius of curvature of joint portion 16 is $x_3$, which is different from radii $x_1$ and $x_2$. Radius $x_3$ is larger than radii $x_1$ and $x_2$ and, since portion 16 merges smoothly with periphery 24, the outermost extremity 30, which will be substantially midway between the superior and inferior extremities and substantially midway between the anterior and posterior extremities, will be slightly pointed or will present a slight projection or raised area, whereby head member 12 will have a non-spherical configuration. Since radius $x_3$ is larger than radii $x_1$ and $x_2$, the centers of curvature of the two convex surfaces of revolution on opposite sides of the dashed center line perpendicular to periphery 24 (FIGS. 5a-5f) will also be on opposed sides of the dashed line as shown in FIGS. 5a and 5d. To illustrate the pointed character of the extremity 30, an arcuate dashed line having radius $x_3$ is drawn tangent to this extremity with a center of curvature at the intersection of the center line and periphery 24.

To carry out the teachings of this invention, the values of $x_1$, $x_2$ and $x_3$ are approximately in accordance with the following relative values:

$$x_1 = 1$$

$$x_2 = {}^{31}\!/_{32}$$

$$x_3 = 1\,{}^{1}\!/_{32}$$

Minor variations in these values may occur due to biologic variations encountered in specific cases. The desired end is to have prosthesis 10 accommodate to physiologic function.

Head member 12 can be of any size but normally it will have an average diameter at periphery 24 in the range of 1½ inches to 2¼ inches. However, regardless of the size of head member 12, the values of $x_1$, $x_2$ and $x_3$ will generally remain proportional to each other in accordance with the foregoing relative values.

FIGS. 5b, 5c, 5e and 5f show cross-sectional views of head member 12 through other sagital planes, those denoted by lines b—b, c—c, e—e, and f—f of FIG. 3a. These views also show the pointed character of extremity 30 and reveal the non-spherical configuration of the head member as caused by the difference in radii $x_1$ and $x_2$.

The head member of the prosthesis of this invention therefore deviates from a sphere in at least three ways. These are as follows: The first deviation arises because of the difference between the average radius of curvature of periphery 24 and the radius of curvature of the outer surface of joint portion 16. The second deviation arises because pointed extremity 30 results from the way in which the convex outer surface of joint portion 16 is formed notwithstanding the fact that the radius of joint portion 16 is the same at least in both of the sagital planes corresponding to lines a—a and d—d of FIG. 3a. The third deviation arises because of the slightly oval configuration of head member 12 due to the presence of stretches 26 and 28 defining continuous periphery 24.

A second form of the head member is shown in FIG. 3b and differs from the form of FIG. 3a in that periphery 24 has a uniform radius $x_4$ throughout its entire extent. This form of the invention is adapted for use where production techniques are not as advanced as those which produce the first form of the invention. To carry out the teachings of the invention with respect to the second form of the invention, the radii $x_3$ and $x_4$ have relative values of 1 and ${}^{15}\!/_{16}$ respectively. Thus, the head member will have have the pointed character of its outermost extremity and thereby be of a non-spherical configuration.

In use, prosthesis 10 is inserted in place within a hip joint whose socket 34 (FIG. 4) is covered with a cartilage 36. Joint portion 16 is shiftably mounted in the socket and slidably engages cartilage 36, while stem 14 is secured to the adjacent bone structure which is the femur whose femoral head has been removed. As head member 12 moves within socket 34, joint portion 16 shifts relative to cartilage 16 and the shape of the head member subjects the cartilage to intermittent pressures which maintains the cartilage supplied with nutrients. Thus, the cartilage is prevented from wearing away.

In the form of the invention shown in FIG. 3b, joint portion 16 will define a surface of revolution about the axis defined by the dashed center line perpendicular to periphery 24. The motion of head member 12 in the hip socket will generally not be limited to movement about the aforesaid axis. Thus, the action on the cartilage will be more nearly normal and the cartilage will be subjected to the desired intermittent pressures which draw nutrients into, through, and out of the cartilage.

The prosthesis of this invention is especially useful in the treatment of the following hip conditions: (1) some fractures of the femoral head or neck; (2) degenerative arthritis of the hip; (3) aseptic necrosis of the head of the femur; (4) tumors of the head and neck of the femur; (5) fusion of the hip joint; and (6) some other mechanical disorders of the hip joint.

While several embodiments of this invention have been shown and described, it will be apparent that other adaptations and modifications can be made without departing from the true spirit and scope of the invention.

What is claimed is:

1. In a hip prosthesis: a head member having a pair of interconnected sections, one of the sections having an outer surface and adapted to be shiftably mounted in the socket of a hip joint, said outer surface being substantially convex throughout its entire extent, the other section extending outwardly from said one section and adapted to be secured to bone structure adjacent to said socket, the head member having a continuous outer periphery and having a maximum transverse dimension at said periphery, the latter defining the junction of said sections, the periphery defining at least one stretch having a curvature different from the curvature of said convex outer surface.

2. In a hip prosthesis as set forth in claim 1 wherein the curvature of said one stretch is greater than the curvature of said convex outer surface.

3. In a hip prosthesis: a head member having a pair of interconnected sections, one of the sections adapted to be shiftably mounted in the socket of a hip joint and the other section adapted to be secured to bone structure adjacent to said socket, the junction between said sections defining a continuous outer periphery, said head member having a maximum transverse dimension at said periphery, one stretch of said periphery having a first radius of curvature and a second stretch of the periphery having a second radius of curvature, said first section having a convex outer surface terminating at said periphery and having a radius of curvature different from the radii of curvature of said stretches.

4. In a hip prosthesis as set forth in claim 3 wherein said convex outer surface has a radius of curvature greater than the radii of curvature of said stretches.

5. In a hip prosthesis: a head member having a rounded joint portion adapted to be shiftably mounted in the socket of a hip joint and a neck portion adapted to be secured to one end of a mounting stem for securing the head member to bone structure adjacent to said socket, said head member further having a continuous outer periphery at the junction of said joint and neck portions with the periphery being disposed in a first plane extending through the head member, said joint and neck portions having respective, continuous extremities terminating at and merging with said periphery, said joint portion being provided with a convex outer surface throughout its entire extent and having a first radius of curvature in a second plane passing through said head member with the second plane being substantially perpendicular to said first plane, said periphery having a second radius of curvature less than said first radius of curvature to provide a non-spherical configuration for said head member.

6. In a hip prosthesis as set forth in claim 5, wherein said convex outer surface has said first radius of curvature in a third plane passing through the head member and being substantially perpendicular to said first and second planes.

7. In a hip prosthesis as set forth in claim 5, wherein said periphery has a pair of interconnected stretches, one of the stretches having a radius of curvature different from the radius of curvature of the outer stretch.

8. In a hip prosthesis as set forth in claim 7, wherein the ratio of the radius of curvature of said one stretch to the radius of curvature of the other stretch is approximately $1:31/_{32}$.

9. In a hip prosthesis as set forth in claim 5, wherein the ratio of the average value of said second radius of curvature to said first radius of curvature is approximately $1:11/_{32}$.

10. In a hip prosthesis as set forth in claim 5, wherein said periphery is circular and said second radius of curvature is less than said first radius of curvature.

11. In a hip prosthesis as set forth in claim 10, wherein the ratio of said first radius to said second radius is $15/_{16}:1$.

12. In a prosthesis for a hip joint: a head member having a superior extremity and an inferior extremity and provided with a continuous outer periphery disposed in a first plane extending through said extremities, there being a neck portion on one side of said plane and a rounded joint portion on the opposite side of the plane, said neck portion adapted to be secured to a mounting stem, said joint portion adapted to be shiftably disposed in the socket of a hip joint and being provided with a convex outer surface terminating at said periphery, said convex outer surface extending across a plurality of angularly disposed sagital planes passing through said head member, being disposed substantially perpendicular to said first plane, and intersecting at a common location centrally of said joint portion, said convex outer surface defining a pair of arcs in respective, mutually perpendicular sagital planes, the arcs having substantially the same radius of curvature with said radius being greater than the average value of the radius of curvature of said periphery to provide a non-spherical configuration for said head member.

References Cited

UNITED STATES PATENTS

| | | | |
|---|---|---|---|
| 3,228,393 | 1/1966 | Michele | 128—92 |
| 3,320,951 | 5/1967 | Wittebol | 128—92 |

OTHER REFERENCES

McBride, E. D.: Journal of the International College of Surgeons, April 1951, pp. 498–503.

L. W. TRAPP, Primary Examiner